United States Patent [19]

[11] 4,354,403

Boëgel et al.

[45] Oct. 19, 1982

[54] SCREW DRIVER APPARATUS

[75] Inventors: Gerhard Boëgel, Heerbrugg; Max Sahli, Altstaetten, both of Switzerland

[73] Assignee: SFS Stadler AG, Heerbrugg, Switzerland

[21] Appl. No.: 6,634

[22] Filed: Jan. 26, 1979

[30] Foreign Application Priority Data

Feb. 14, 1978 [AT] Austria ................................ 1063/78

[51] Int. Cl.³ ............................................. B23P 19/00

[52] U.S. Cl. .................................... 81/57.37; 81/453; 81/455

[58] Field of Search .................... 144/32; 29/240, 771, 29/809, 813; 81/57.23, 57.37, 453, 455, 456; 227/18, 120, 157; 145/52

[56] References Cited

U.S. PATENT DOCUMENTS

| | | | |
|---|---|---|---|
| 3,583,451 | 8/1971 | Dixon | 144/32 |
| 3,929,176 | 12/1975 | Dixon | 144/32 R |
| 3,930,808 | 1/1976 | Miller et al. | 144/32 R X |
| 3,965,950 | 6/1976 | MacDonald | 144/32 R |

FOREIGN PATENT DOCUMENTS

| | | | |
|---|---|---|---|
| 237547 | 4/1964 | Austria . | |
| 314441 | 3/1971 | Austria . | |
| 727454 | 1/1969 | Belgium . | |
| 1403402 | 10/1968 | Fed. Rep. of Germany . | |
| 2517061 | 4/1975 | Fed. Rep. of Germany . | |
| 2624441 | 6/1976 | Fed. Rep. of Germany . | |
| 2630751 | 7/1976 | Fed. Rep. of Germany . | |
| 282474 | 4/1952 | Switzerland . | |
| 1090806 | 11/1967 | United Kingdom | 144/32 |
| 1339949 | 12/1973 | United Kingdom . | |

*Primary Examiner*—W. D. Bray
*Attorney, Agent, or Firm*—Toren, McGeady & Stanger

[57] ABSTRACT

Screw driving apparatus in which a slide is movable back and forth on a support and is formed with a chute extending in the slide away from the support toward an open end of the chute, and with an access opening to the chute. A driver is mounted on the support for rotation in the chute and for movement in the chute toward and away from the open end in response to the back-and-forth movement of the slide. The slide carries a control plate capable of limited movement relative to the slide between two terminal positions spaced in the direction of slide movement. Two jaws are pivotally mounted on the slide and may jointly obstruct the open end of the chute. A jaw operating member on the control plate engages the jaws and moves them toward and away from the chute-obstructing position in response to movement of the control plate between its terminal positions which is caused by motion transmitting elements on the support when the slide moves back and forth.

7 Claims, 10 Drawing Figures

SCREW DRIVER APPARATUS

This invention relates to apparatus for automatically driving screws into materials to be fastened to each other, and particularly to automatic screw driving apparatus capable of operating in restricted work areas.

It is known from British Pat. No. 1,339,949 to arrange a blade guide slidable on supporting structure which carries a screw driver and a driving device for turning the screw driver. Guide jaws normally obstruct the free, open end of the blade guide to retain a screw fed to the blade guide until the screw can be engaged by the blade as the blade guide is moved toward the supporting structure by engagement with a workpiece. Ultimately, the head of the screw forces the resiliently mounted jaws apart, and the screw is released.

The known device is relatively bulky and is not conveniently employed in restricted space, as is necessary in attaching corrugated sheet metal having narrow ridges and grooves to a substrate. Also, it relies on spring mounted jaws which are displaced by the screws themselves, an arrangement which is simple, but not foolproof.

It is an important object of this invention to provide screw driving apparatus which is capable of being utilized in very narrow spaces.

Another object is the provision of such apparatus which relies on springs only for operation of less sensitive elements than the jaws required for retaining the screws in position until safely engaged by a screw driver blade or other driver.

With these objects and others in view, as will presently become apparent, the screw driving apparatus of the invention is provided with a first and a second member movable relative to each other and with a chute having an open end with an access opening to the chute through which screws to be driven may be inserted. A blade or other driver is mounted on the second member for rotation in the chute and for movement in the chute toward and away from the open end in response to the movement of the second member. A control plate is mounted on the first member for limited movement between two terminal positions in the direction of relative movement between the first and second members. Two jars are mounted on the first member for pivoting movement about respective axes which are parallel to each other and transverse to the direction of relative movement of the first and second members toward and away from a position in which they jointly obstruct the open end of the chute. A jaw operating member mounted on the control plate engages the jaws and moves them about their axes toward and away from their chute obstructing position in response to movement of the control plate between its terminal positions. Motion transmitting elements move the control plate between its terminal positions in response to the relative movement between the first and second members.

The apparatus can be reduced to a minimal width if the parallel pivot axes of the jaws are perpendicular to a reference plane extending in the direction of slide movement, and when the control plate is substantially parallel to this plane. When the access opening to the chute also is located in this reference plane, a feed channel elongated in the plane and communicating with the access opening may be provided without increasing the width of the apparatus.

Other features, additional objects, and many of the attendant advantages of this invention will readily be appreciated as the same becomes better understood by reference to the following description of a preferred embodiment when considered in connection with the appended drawing in which.

Figure 1:
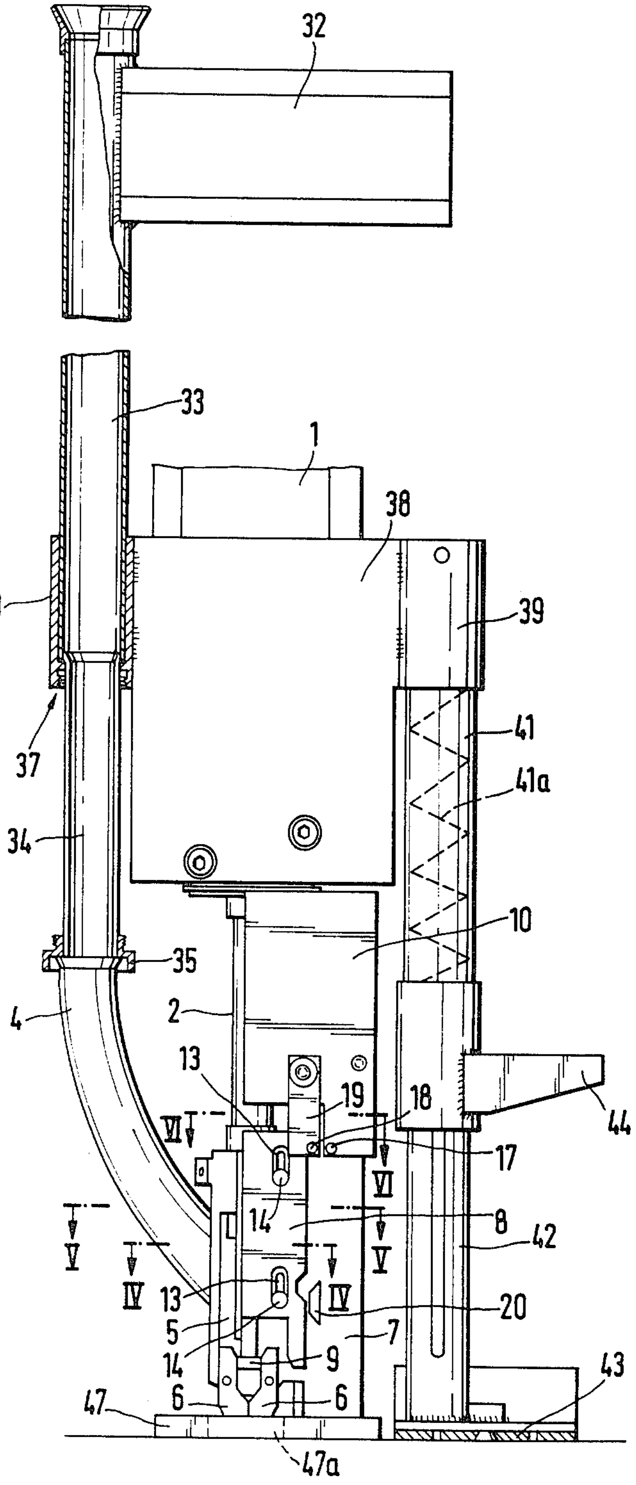
FIG. 1 shows screw driving apparatus of the invention in side-elevation and partly in section.
Figure 4:
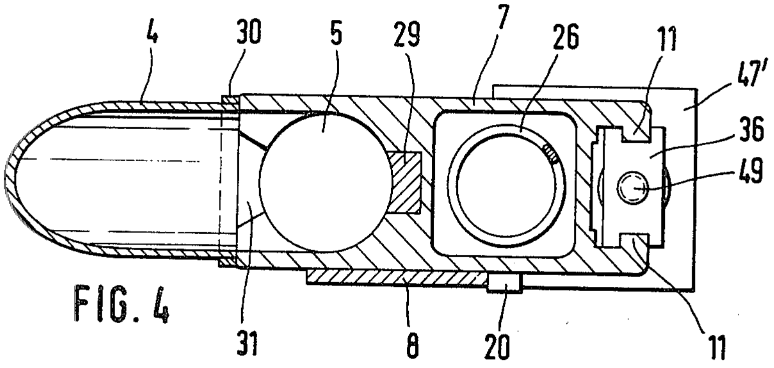
Figure 5:
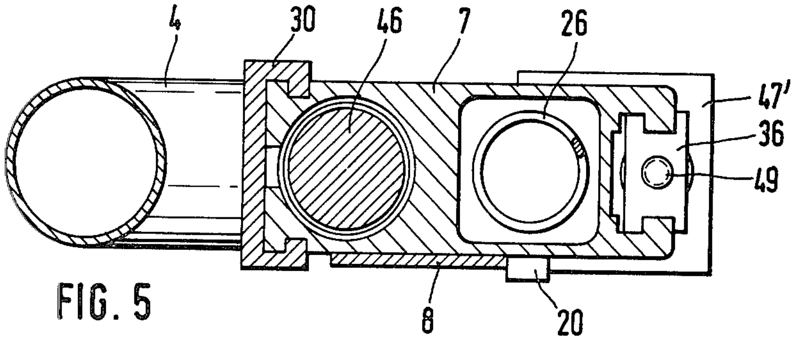
Figure 6:
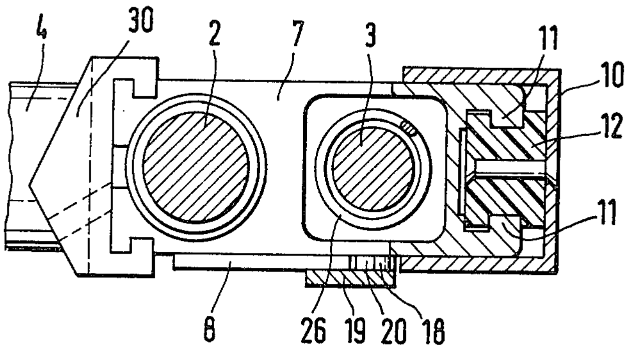
Figure 7:
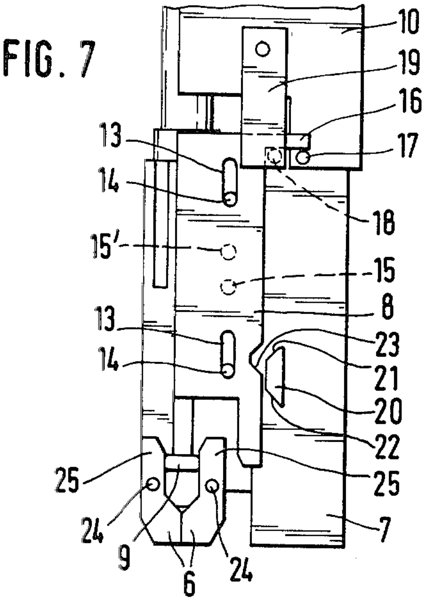
Figure 8:
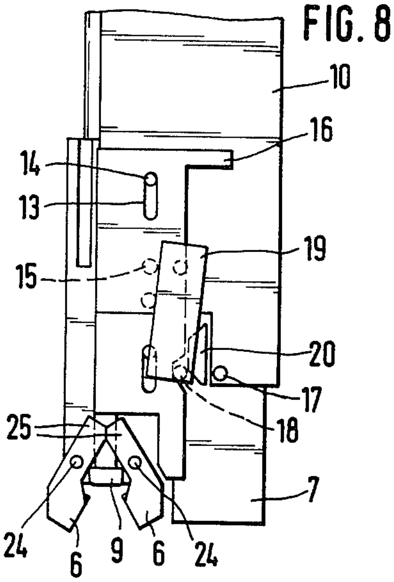
Figure 9:
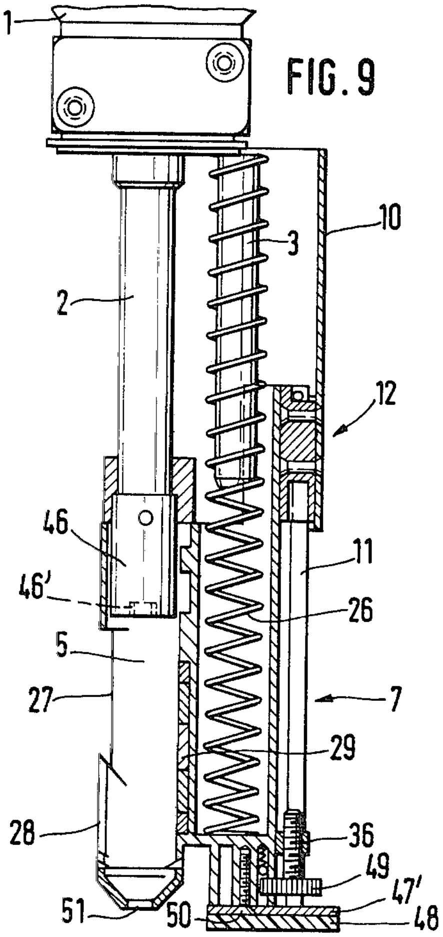
Figure 10:
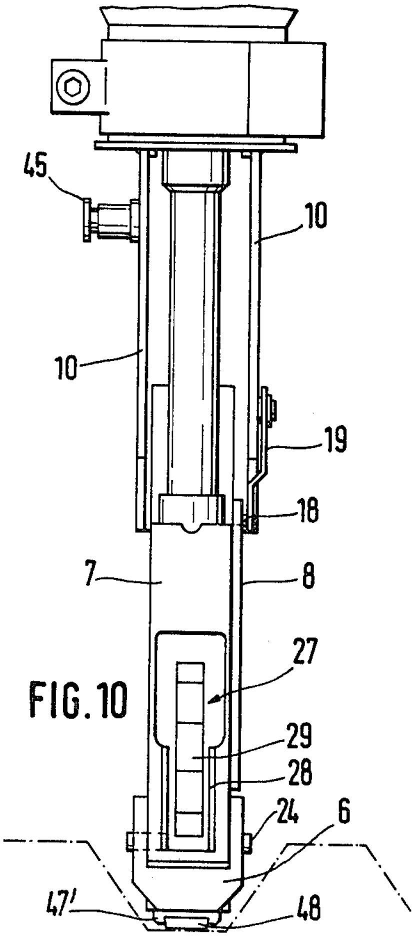

FIGS. 4, 5, and 6 show the apparatus of FIG. 1 in respective enlarged, partial sections on the lines IV—IV, V—V, and VI—VI;

FIG. 7 is an enlarged view of a portion of the apparatus of FIG. 1;

FIG. 8 shows the device of FIG. 7 in a different operating condition;

FIG. 9 illustrates a portion of the apparatus of FIG. 1 in enlarged side-elevational section; and FIG. 10 is a rear elevational view of the device of FIG. 9.

Referring now to the drawing in detail, and initially to FIG. 1, there is shown a portable screw driving apparatus whose source of motive power is an electric drill 1 only partly shown in the drawing for the sake of clarity, and more fully illustrated in the copending, commonly assigned application of one of us, Ser. No. 972,395, filed Dec. 22, 1978. The drill is partly obscured by a supporting housing 38 in which it is fixedly but releasably mounted. A drive shaft 2 fastened in the non-illustrated chuck of the drill extends downward beyond the housing 38 toward operating elements attached to the housing 38 by a second member or casing 10 and by a first member or slide 7 vertically movable relative to the casing 10 between a retracted position and a projected position.

Figure 3:
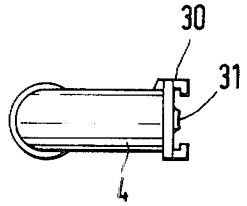
FIG. 3 is a bottom plan view of the element of FIG. 2.
Figure 2:
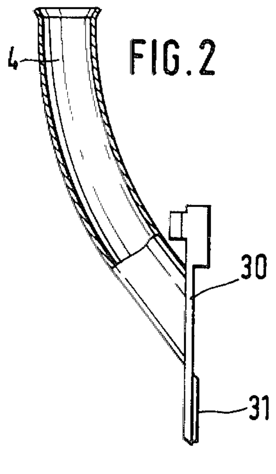
FIG. 2 illustrates a detached element of the apparatus of FIG. 1 in a corresponding view.

A tubular bracket 40 on the housing 38 vertically secures a feeding tube 33 to the housing. The apparatus is moved and operated by means of a handle 32 horizontally extending from the tube 33 near its funnel-shaped top in approximate vertical alignment with the housing 38. Another tube 34 may slide inward of the lower end 37 of the tube 33 from the illustrated position. The lower end 37 of the tube 34 rests on the upper end of a tubular feed channel 4 by means of a collar 35. The lower end of the channel 4 is releasably attached to a chute portion 5 of the slide 7 by means of ribs on a flange 30 of the channel which are slidably received in vertical grooves of the slide 7 as is better seen in FIGS. 2, 3, and 5. A rib 31 on the flange 30 is received in the narrow part 28 of a keyhole-shaped access opening 27 in the slide 7 (see FIG. 10) to secure the channel 4 vertically in a position in which screws dropped into the funnel-shaped top of the tube 33 slide into the chute 5.

A control plate 8 of sheet metal is attached to the slide 7 by means of two studs 14 received in respective vertically elongated slots 13 of the plate 18, thereby permitting limited vertical movement of the plate on the slide 7. The enlarged head 9 of a flat, jaw operating bar depending from the plate 8 holds two jaws 6 on the slide 7 in a position in which they downwardly obstruct the chute 5, as will presently be described in more detail. The slide 7 also carries a horizontal abutment plate 47 having an aperture 47*a* aligned with the lower end of the chute 5 and the jaws 6.

One end of a sheet metal arm 19 is pivotally fastened to the casing 10, and the depending end of the arm carries a pin 18 spacedly adjacent a retaining pin 17 on the casing 10. A cam 20 on the slide 7 is aligned with the pin 18 in such a manner that the cam deflects the pin 18 into a notch of the plate 8 when the casing 10 is pushed downward over the slide 7 by means of the handle 32.

Another tubular bracket 39 fixed on the housing 38 fixedly attaches a vertical tube 41 to the housing. A tube 42 is slidably received in the coaxial tube 41 and biased downward outward of the tube 41 by a helical compression spring 41a. A sleeve fixed on the lower end of the tube 41 carries a horizontally projecting pedal 44. The lower end of the tube 42 carries an abutment foot 43.

As is better seen in FIGS. 4, 5, 6, and 9, the slide 7 is guided vertically in the casing 10 by a grooved block 12 fastened in the casing and engaged by flanges 11 on the slide 7, and is biased downward out of the casing 10 by a strong, helical compression spring 26 partly coiled about a cylindrical bar 3 depending from the housing 38 and partly confined in a duct in the slide 7 whose closed bottom is engaged by the spring 26. Movement of the slide 7 inward of the casing 10 may be limited precisely by an abutment 36 slidably received between the flanges 11 and axially secured on the slide 7 by an adjusting screw 49 whose knurled head is accessible outside the slide 7 but has been omitted from FIG. 1. A screw 50 releasably fastens an abutment plate 47' carrying a rubber pad 48 to the slide 7, but may alternatively hold the larger plate 47 shown in FIG. 1. The plate 47' does not extend below the chute 5.

The free lower end of the drive shaft 2 in the chute 5 carries a driver 46 whose bottom face is provided with a hexagonal recess 46' matching the hexagonal heads of the screws to be driven. The front wall of the chute 5 is partly formed by rod magnets 29 opposite the access opening 27. A screw 45 on the casing 10 (FIG. 10) permits the slide 7 to be fastened in its retracted position in the casing to reduce the overall height of the apparatus while it is not in use.

As is best understood from joint consideration of FIGS. 7, 8, and 10, each jaw 6 is approximately U-shaped and attached to the slide 7 by pivot pins 24 passing through the two leg portions 25 of the jaw from the slide 7 received between the leg portions. The bight portions of the two jaws are offset toward each other so that they are abuttingly engaged when the head 9 is received between the parts of the leg portions 25 above the pivot pins 24, as is shown in FIG. 7. Notches in the bight portions define a small opening 51 coaxial with the chute 5 (FIG. 9) in the otherwise closed jaws 6.

The control plate 8 is secured on the slide 7 in its two terminal, vertical positions seen in FIGS. 7 and 8 respectively by a click-stop arrangement including a spring-loaded ball 15 at least partly recessed in the slide 7 and alternatively engaging two hemi-spherical recesses 15' in the face of the plate 8 directed away from the viewer in FIGS. 7 and 8. An arm 16 projecting horizontally from the top portion of the plate 8 behind the arm 19 abuttingly engages the retaining pin 17 on the casing 10 and holds the plate 8 in its upper position when the slide 7 fully projects from the casing 10, as is shown in FIG. 7.

When the casing 10 is moved downward over the slide 7 into the position illustrated in FIG. 8, the pin 18 is deflected by an oblique face 21 of the cam 20 into the notch 23 of the plate 8 and thereafter entrains the plate downward until the studs 14 reach the upper ends of the slots 13. The plate 8 thereafter moves further inward of the casing 10 as the casing continues its downward movement from the position of FIG. 8. During the return movement of the casing, the pin 18 again is deflected into the notch 23 by an oblique face 22 of the cam 20, and the plate 8 is returned to the position on the slide 7 illustrated in FIG. 7. As the plate 8 moves downward on the slide 7, the head 9 causes the bight portions of the jaws 6 to move apart as it engages the parts of the leg portions 25 below the pivot pins 24.

The apparatus described above with reference to the drawing is dimensioned for attaching corrugated sheet metal, indicated in phantom line in FIG. 10 only, to a substrate, such as wood, by means of short, self-tapping screws having a hexagonal head provided with a fixed circular flange at its base. As is evident from FIGS. 4–6 and 10, the operating assembly at the normally lower end of the apparatus is so narrow that it can be inserted into very narrow grooves in the sheet material. The channel 4 projects from the slide 7 in a median plane extending in the directions of groove elongation and slide movement.

In operating the apparatus, the abutment plate 47 or 47' and the foot 43 are inserted into a groove of the sheet material, and a screw is dropped shank first into the funnel-shaped top end of the tube 33. It slides through the tube 34 and the channel 4 into the chute 5, being guided by the flange on its head, and the sharp point of its shank enters the opening 51. Thereafter, the housing 38 is pushed down toward the sheet metal by means of the handle 32 and by a foot placed on the pedal 44 against the restraint of the main compression spring 26 assisted to a minor extent by the spring 41a. While the rotating driver 46 approaches the head of the screw held between the jaws 6, the casing 10 moves over the slide 7. As soon as the driver 46 engages the hexagonal screw head, the jaws 6 are spread apart by the head 9, permitting the screw to be driven through the sheet metal and into the substrate. When the abutment 36 engages the guide block 12, there is a sudden increase in the resistance against further downward movement of the housing 38, and the operator relaxes his pressure on the handle 32 and pedal 44. The springs 26, 41a return the apparatus to the condition shown in FIG. 1, and the jaws 6 close above the head of the driven screw. If so desired, the driver 46 may be equipped with an overload clutch, conventional in this art, to prevent turning of the driver against a resistance exceeding a fixed value while the shaft 2 continues rotating.

When screws are to be driven into the bottom face of material above the operator's head, the tube 34 is telescoped into the tube 33 to release the channel 4, and the latter is slipped off the slide 7. With the apparatus in an inverted position, and the keyhole-shaped opening 27 exposed, the operator may insert a screw manually into the chute 5 and into engagement with the magnets 29 which hold the screw until it is engaged by the driver 46.

Dimensional properties of the illustrated embodiment are readily modified to adapt the apparatus to screws different from those described as to size, head configuration, threads, and the like without loss of the advantages of this invention such as the slimness of the operating end of the apparatus which permits its use in cramped locations.

It should be understood, therefore, that the foregoing disclosure relates only to a presently preferred embodiment, and that it is intended to cover all changes and modifications of the example of the invention herein chosen for the purpose of the disclosure which do not constitute departures from the spirit and scope of the invention set forth in the appended claims.

What is claimed is:

1. Screw driving apparatus comprising a first member having a pair of jaws pivotally mounted thereon for holding a screw to be driven and for releasing said screw upon pivotal movement of said jaws; chute means for delivering a screw to between said jaws to be held thereby in a position to be driven; driver means for engaging a screw held by said jaws to effect driving thereof; control means mounted for movement together with said driver means for effecting pivotal movement of said jaws to release said screw as said driver means is brought into driving engagement therewith; and magnet means located within said chute means adjacent said jaws for holding a screw to be driven against the force of gravity in position for engagement by said driver means.

2. Screw driving apparatus comprising a first member having a pair of jaws pivotally mounted thereon for holding a screw to be driven and for releasing said screw upon pivotal movement of said jaws; chute means for delivering a screw to between said jaws to be held thereby in a position to be driven; driver means for engaging a screw held by said jaws to effect driving thereof; control means mounted for movement together with said driver means for effecting pivotal movement of said jaws to release said screw as said driver means is brought into driving engagement therewith; and a second member having said driver means mounted for movement therewith, said second member being mounted for movement relative to said first member for bringing said driver means into and out of engagement with a screw held by said jaws; said control means including an actuating member movable in response to relative movement between said first and said second members for effecting pivotal movement of said jaws to release a screw held therein, an arm pivotally mounted on said second member, a cam plate affixed to said first member, a control plate having said actuating member affixed thereto, and cam follower means mounted on said arm and adapted to engage said cam plate to effect pivotal movement of said cam plate, said control follower means being brought into driving engagement with said control plate by movement of said second member relative to said first member to drive said actuating member into engagement with said jaws to effect said pivotal movement thereof.

3. Apparatus according to claim 2 wherein said control plate is slideably mounted on said first member for movement between a first and a second position.

4. Apparatus according to claims 2 or 3 wherein said control plate is movable relative to said first member between a first position where said actuating member is operative to pivotally move said jaws to release a screw held thereby and a second position where said actuating member is out of engagement with said jaws to permit said jaws to return to a position for holding a screw to be driven, said cam plate being configured to bring said cam follower means into driving engagement with said control plate during relative movement between said first and said second members in two opposed directions, said cam follower means thereby operating to drive said control plate to both said first and said second positions thereof.

5. Apparatus according to claim 4 wherein said control plate includes notch means formed therein adapted to engage said cam follower means and wherein said cam plate is formed with a trapezoidal configuration adapted to move said cam follower means into said notch means when said cam follower means is moved toward said cam plate in either of two opposite directions, said cam plate operating to hold said cam follower means in engagement within said notch means over a predetermined distance of relative movement between said cam follower means and said cam plate.

6. Apparatus according to claim 4 further comprising click stop means for yieldably securing said control plate in both of said first and said second positions.

7. Screw driving apparatus comprising a first member having a pair of jaws pivotally mounted thereon for holding a screw to be driven and for releasing said screw upon pivotal movement of said jaws; chute means for delivering a screw to between said jaws to be held thereby in a position to be driven; driver means for engaging a screw held by said jaws to effect driving thereof; control means mounted for movement together with said driver means for effecting pivotal movement of said jaws to release said screw as said driver means is brought into driving engagement therewith; and a second member having said driver means mounted for movement therewith, said second member being mounted for movement relative to said first member for bringing said driver means into and out of engagement with a screw held by said jaws; said chute means including an inlet opening through which a screw to be driven may be placed in position for operative engagement by said jaws, said driver means being movable within said chute means between a first position in driving engagement with said screw and a second position out of driving engagement with said screw, said inlet opening being located intermediate said first and said second positions of said driver means.

* * * * *